United States Patent Office 3,162,675
Patented Dec. 22, 1964

3,162,675
PROCESS FOR MAKING NITROAROMATIC
NITRILES
George Andrew Olah and Stephen Joseph Kuhn, both of Sarnia, Ontario, Canada, assignors to The Dow Chemical Company, Midland, Mich., a corporation of Delaware
No Drawing. Filed Sept. 19, 1961, Ser. No. 139,073
7 Claims. (Cl. 260—465)

This invention relates to a process for making nitroaromatic nitriles. More specifically, it relates to a direct nitration process for making mononitro and dinitro aromatic nitriles.

Nitroaromatic nitriles can be made only with difficulty or not at all by the conventional process of nitrating an aromatic nitrile with nitric acid or a nitric acid-sulfuric acid mixture, because the nitrating acid tends to hydrolyze the nitrile group. Dinitroaromatic nitriles cannot be made at all by this process because of the more severe reaction conditions required. To make such nitroaromatic nitriles, therefore, it is usually necessary to resort to indirect and wasteful methods of synthesis.

We have found that aromatic nitriles can be nitrated easily and in good yield to the corresponding mononitro or dinitro nitriles without hydrolysis of the nitrile group by using as the nitrating agent certain stable nitronium salts. Among suitably stable nitronium salts which may be so used are $NO_2BF_4$, $NO_2PF_6$, $NO_2SbF_6$, $NO_2AsF_6$, $(NO_2)_2SiF_6$, $NO_2SbCl_6$ and $NO_2ClO_4$. Nitronium fluoborate, $NO_2BF_4$, is ordinarily used for reasons of convenience and availability.

The nitronium salts listed above are easily handled solids which are stable in the absence of moisture. The preparation of $NO_2BF_4$ by the reaction of boric oxide, nitrogen tetraoxide, and bromine trifluoride as described by Woolf and Emeleus, J. Chem. Soc. 1950, 1050, and the preparation of the same compound by the reaction of nitrogen pentoxide with hydrogen fluoride and boron trifluoride as described by Schmeisser and Elisher, Zeit. Naturforsch. 7b, 583 (1952), and Olah, Kuhn and Mlinko, J. Chem. Soc. 1956, 4257, are characteristic.

The nitration reaction between these nitronium salts and aromatic nitriles proceeds smoothly at moderate temperatures. Mononitration is done conveniently at about 15° C. to about 60° C., depending upon the nitrile being reacted. More reactive nitriles such as benzonitrile and tolunitrile are mononitrated at suitable rates at about 20–30° C. while less active nitriles such as the halogenated benzonitriles require higher reaction temperatures of about 40–50° C. Dinitrations require generally higher temperatures in the approximate range of 60–125° C. It is to be understood that the reaction temperature mentioned are those found to give conveniently controlled reaction rates and that reaction temperatures outside these ranges are operable although they may be less satisfactory.

We have found it advantageous, when carrying out a distinction, first to run the mononitration step at the lower temperature required for this reaction, and then to nitrate further the mononitro compound so obtained by adding the additional nitronium salt necessary to the reaction mixture and raising the reaction temperature to the required higher level.

An excess of nitronium salt yields the best results in both the mononitration and the dinitration steps. For example, we have found that from about 1.1 to about 1.3 moles of nitronium salt per mole of nitrile provides the best yields of mononitro compound, and about 1.25 moles of nitronium salt is preferred. For the nitration of the mononitronitrile to the dinitro compound, a larger excess of nitronium salt is of advantage. For this purpose, we prefer to use from about 1.6 to about 1.9 moles of nitronium salt per mole of mononitro nitrile and about 1.75 moles is most preferred.

The reaction is preferably run in an inert solvent capable of dissolving both the nitronium salt and the nitrile. Suitable solvents include tetramethylene sulfone, and nitromethane. For convenience in separating the final product, a solvent miscible with water such as tetramethylene sulfone is most preferred.

By the term "aromatic nitrile" as used herein, we mean carbocyclic aromatic nitriles such as benzonitriles, tolunitriles, naphthonitriles, and the like, and also the nitriles of nitrogen and sulfur containing heterocycles having aromatic properties such as cyanopyrroles, cyanoindoles, cyanopyrimidines, cyanopyridines, cyanoquinolines, cyanothiophenes, cyanothiazoles, and similar compounds. All these nitriles may additionally be substituted with groups unreactive in the process. Such unreactive groups include alkyl, halogen, nitro, carboxyl, and aldehyde. Reactive groups which interfere in the reaction may not be present. Among the reactive groups known to interfere in the reaction are amino and hydroxyl.

The following examples illustrate preferred modes of applying our process.

EXAMPLE 1

To a stirred solution of 0.125 g. mole of nitronium fluoborate in 150 ml. of tetramethylene sulfone was added dropwise 0.1 g. mole of benzonitrile. The reaction started spontaneously and the temperature was maintained by occasional cooling at 20–35° C. The addition was completed in about ten minutes and the reaction mixture was stirred an additional twenty minutes at the above temperature. The reaction mixture was cooled to room temperature and 300 g. of water was added. The precipitated solid was separated by filtration, washed with water and recrystallized from alcohol. The product was m-nitrobenzonitrile, melting point 118° C. and it amounted to 12.6 g., a yield of 85% based on the starting benzonitrile.

EXAMPLE 2

To a solution of 0.125 g. mole of nitronium fluoborate in 150 ml. of tetramethylene sulfone was added with stirring 0.1 g. mole of p-tolunitrile over a period of about ten minutes. The reaction was spontaneous at room temperature and the reaction mixture was maintained at 20–35° C. by occasional cooling. At the end of this time, an additional 0.175 g. mole of nitronium fluoborate was added to the reaction mixture and the temperature of the mixture was raised to 90–100° where it was maintained while stirring for thirty minutes. The mixture was then cooled to room temperature and worked up as in Example 1. There was obtained 17.2 g. of 3,5-dinitro-p-tolunitrile, melting point 103–104° C.

By the procedures described in Examples 1 and 2, other mononitro and dinitro aromatic nitriles were prepared. In the cases of somewhat deactiviated nitriles, such as halonitriles, it was necessary to heat the mixture to 40–50° C. in order to start the reaction. The data of some of these preparations are listed in Table I.

Table I

| ArCN | Ratio, ArCN:NO$_2$BF$_4$ | Product | React. Temp., °C. | React. Time, Minutes | Yield, Percent | Product, M.P., °C. |
|---|---|---|---|---|---|---|
| Benzonitrile | 1:1.25 | 3-nitrobenzonitrile | 20-35 | 30 | 85 | 118 |
| o-Tolunitrile | 1:1.25 | 5-nitro-o-tolunitrile | 20-35 | 30 | 90.1 | 105 |
| m-Tolunitrile | 1:1.25 | nitrotolunitrile isomer mixture. | 20-35 | 30 | 85 | |
| p-Tolunitrile | 1:1.25 | 3-nitro-p-tolunitrile | 20-35 | 30 | 92 | 107 |
| p-Fluorobenzonitrile | 1:1.25 | 4-fluoro-3-nitro benzonitrile. | 40-50 | 30 | 90 | 91 |
| p-Chlorobenzonitrile | 1:1.25 | 4-chloro-3-nitro benzonitrile. | 50-55 | 40 | 92 | 96 |
| 1-Naphthonitrile | 1:1.25 | 3-nitro-1-naphthonitrile | 20-35 | 30 | 91 | 117-118 |
| o-Tolunitrile | 1:3 | 3,5-Dinitro-o-tolunitrile | ¹ 20-35, 90-100 | 30-60 | 93 | 85.5 |
| m-Tolunitrile | 1:3 | dinitro-m-tolunitrile isomer mixture. | ¹ 20-35, 90-100 | 60 | 84 | |
| p-Tolunitrile | 1:3 | 3,5-Dinitro-p-tolunitrile | ¹ 20-35, 90-100 | 40 | 89 | 103-104 |

¹ Done in two steps.

Although the use of only nitronium fluoborate is illustrated by the foregoing examples, other nitronium salts may be used in the same way and are equivalent for the purpose. Nitronium salts known to be equivalent to NO$_2$BF$_4$ in the reaction include NO$_2$PF$_6$, NO$_2$SbF$_6$, NO$_2$AsF$_6$, (NO$_2$)$_2$SiF$_6$, NO$_2$SbCl$_6$, and NO$_2$ClO$_4$.

We claim:

1. A process for making dinitroaromatic nitriles which comprises reacting an aromatic carbocyclic nitrile with a stable nitronium salt selected from the group consisting of NO$_2$BF$_4$, NO$_2$PF$_6$, NO$_2$SbF$_6$, NO$_2$SbCl$_6$, (NO$_2$)$_2$SiF$_6$, NO$_2$AsF$_6$, and NO$_2$ClO$_4$.

2. A process as described in claim 1 wherein the nitronium compound is NO$_2$BF$_4$.

3. A process as described in claim 2 wherein the reaction is carried out between about 15° and about 125° C.

4. A process as described in claim 2 wherein the reaction is carried out in an inert solvent solution.

5. A process for making dinitroaromatic nitriles which comprises reacting one mole of aromatic carbocyclic nitrile with about 1.1–1.3 moles of NO$_2$BF$_4$ at about 15–60° C., heating the obtained reaction mixture to about 60–125° C., adding thereto an additional 1.6–1.9 moles of NO$_2$BF$_4$, and separating the produced dinitroaromatic nitrile from the reaction mixture.

6. A process for making a dinitroaromatic nitrile which comprises reacting one mole of an aromatic carbocyclic nitrile in inert solvent solution with about 2.7 to about 3.2 moles of NO$_2$BF$_4$ at a temperature of about 15° C. to about 125° C. and separating the dinitroaromatic nitrile product from the reaction mixture thereby obtained.

7. A process for making dinitrotolunitrile which comprises reacting in inert solvent solution one mole of tolunitrile with about 1.1–1.3 moles of NO$_2$BF$_4$ at about 15–60° C., heating the thereby obtained reaction mixture to about 60–125° C., adding thereto an additional 1.6–1.9 moles of NO$_2$BF$_4$, and separating dinitrotolunitrile thereby produced from the reaction mixture.

References Cited in the file of this patent

Hetherington et al.: Chemical Society Journal (London), 1954, Pt. 3, pp. 3512–3514.

Olah et al.: Chemical Society Journal (London), 1956, Pt. 4, pp. 4257–4258.